(12) United States Patent
Hemmele et al.

(10) Patent No.: US 6,625,859 B2
(45) Date of Patent: Sep. 30, 2003

(54) JACK BOLT JACKING PLATE

(75) Inventors: Raymond Hemmele, Scottsdale, AZ (US); Craig D. White, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/067,663

(22) Filed: Feb. 4, 2002

(65) Prior Publication Data

US 2003/0147689 A1 Aug. 7, 2003

(51) Int. Cl.$^7$ .......................... B23P 19/04; B23P 19/00; B25B 27/14
(52) U.S. Cl. .................. 29/239; 29/426.5; 29/281.5
(58) Field of Search ................ 29/426.5, 239, 29/240, 244, 256, 258, 266, 270, 280, 278, 281.5

(56) References Cited

U.S. PATENT DOCUMENTS 2,159,593 A  *  5/1939  Klermund ..................... 29/239
3,620,554 A  *  11/1971  Ward et al. ................... 285/18

* cited by examiner

*Primary Examiner*—John C. Hong
(74) *Attorney, Agent, or Firm*—Robert Desmond, Esq.

(57) ABSTRACT

The jacking plate may be used to reinforce structural assembly elements that may be required to withstand the force of the use of a jack bolt to separate assembly elements. The jacking plate may be attached intermediate one structural element and a nut plate. A bushing may be attached in a second structural element through which bushing the jack bolt is threaded to apply force against the jacking plate. The jacking plate may be constructed of a hardened metal such as stainless steel to inhibit deforming of the structural element and nut plate.

11 Claims, 4 Drawing Sheets

JACK BOLT JACKING PLATE

BACKGROUND OF THE INVENTION

This invention relates to jack bolt devices used to separate structures that may normally be bolted or fastened together to form assemblies. The new jacking plate may be used to reinforce a particular structure as for example an aluminum structure that may deform under the force applied when a jacking screw is used to separate physical structures.

Jack bolt assemblies and devices have been used for many years to aid in separating structures that are assembled and fastened together by fasteners such as attachment bolts and nuts. Generally, two structures such as two flanges as part of an assembly or more directly two structural elements may be fastened together by bolts and nuts or other fasteners. When it is desired to separate the two structural elements a jack bolt may be used by engaging the screw threads of the jack bolt with a threaded aperture in one assembly element and rotating the jack bolt to apply force against the other assembly element to thereby separate the two assemblies. In normal use the composition of the two assemblies may be such that the force of separation does not cause any deformation of the structure of the assemblies.

In some applications requiring the use of a jack bolt for separating assemblies, there may not be a surface against which the jack bolt may be engaged to force separation of assemblies. An example of use of an insertable plate to provide a structure for application of a jack bolt is disclosed in U.S. Pat. No. 4,015,324. In this instance the plate must be transported with the jack bolt and inserted to allow use of the jack bolt. The assembly of pipe flanges is not an integral structure that allows simple engagement and use of a jack bolt for separation of the pipes. The use of an insertable plate is not feasible where access to an assembly is inhibited as addressed by the instant invention.

Other examples of jack bolt applications may require use of a washer, as the jack bolt may be a more complex assembly for separating and/or fastening pipe flange assemblies. Such an application is disclosed in U.S. Pat. Nos. 4,540,199 and 4,671,324. In this instance the assembly is no longer a simple jack bolt, but has an extension element that includes a washer and a fastening nut. The disclosure even includes a bearing as an alternate to the washer. This complex assembly may be designed to accomplish several specific operations related to separating and joining pipes; however, it may not be applicable for use in simple applications requiring separation of structural elements.

As can be seen, there is a need for a simple, attachable reinforcement device for use with structural elements that may deform under the force of a jack bolt.

SUMMARY OF THE INVENTION

An improved jack bolt reinforcement device according to the present invention comprises a jacking plate, which may be fastened intermediate, a structural assembly and a fastening nut.

In one aspect of the present invention a jacking plate comprises a plate having a bolt aperture formed therein through which a fastening bolt may be inserted. There may also be a plurality of fastening apertures formed therein for attachment of the jacking plate intermediate a first structural element and a nut fastener. The bolt aperture may be sized to inhibit a jack bolt from passing through the bolt aperture.

In another aspect of the invention the jacking plate may be comprised of a material structure of hardened metal to inhibit deformation of a structural element or nut fastener under the separation force of the jack bolt. The hardened metal may be stainless steel.

In yet another aspect of the invention a jack bolt apparatus for separating structural assembly elements may comprise a jacking plate having a bolt aperture therein attached intermediate an inner structural element and a nut fastener. A threaded bushing may be attached to an outer structural element through which the jack bolt may be threaded. The bolt aperture may be sized to inhibit the jack bolt from passing through the bolt aperture.

In a further aspect of the invention a method for separating structural assembly elements comprises the steps of attaching a jacking plate intermediate a first structural element and a nut fastener wherein the jacking If plate having a bolt aperture for insertion of a fastening bolt and for inhibiting passage of a jack bolt. A bushing may be attached to a second structural element. The jack bolt may be threaded through the bushing to apply force against the jacking plate and force the separation of the structural elements.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The new jacking plate may be used to reinforce structural assemblies that may be fastened together and subsequently may be separated using jack bolts. Such applications may occur in, for example, aircraft assemblies that may use aluminum for structural components as part of an aircraft. Aircraft engines that may include a two piece spinner element for the engine cone structure are examples of such aluminum structures. The spinner elements may be an inner and outer cone structure that may be press fit together to maintain coincident centerlines throughout operating conditions. The cone elements may also be fastened by bolts and nuts. Because of the press fit assembly, disassembly may require the use of jack bolts that thread into the outer cone and press against the inner cone.

Figure 1:
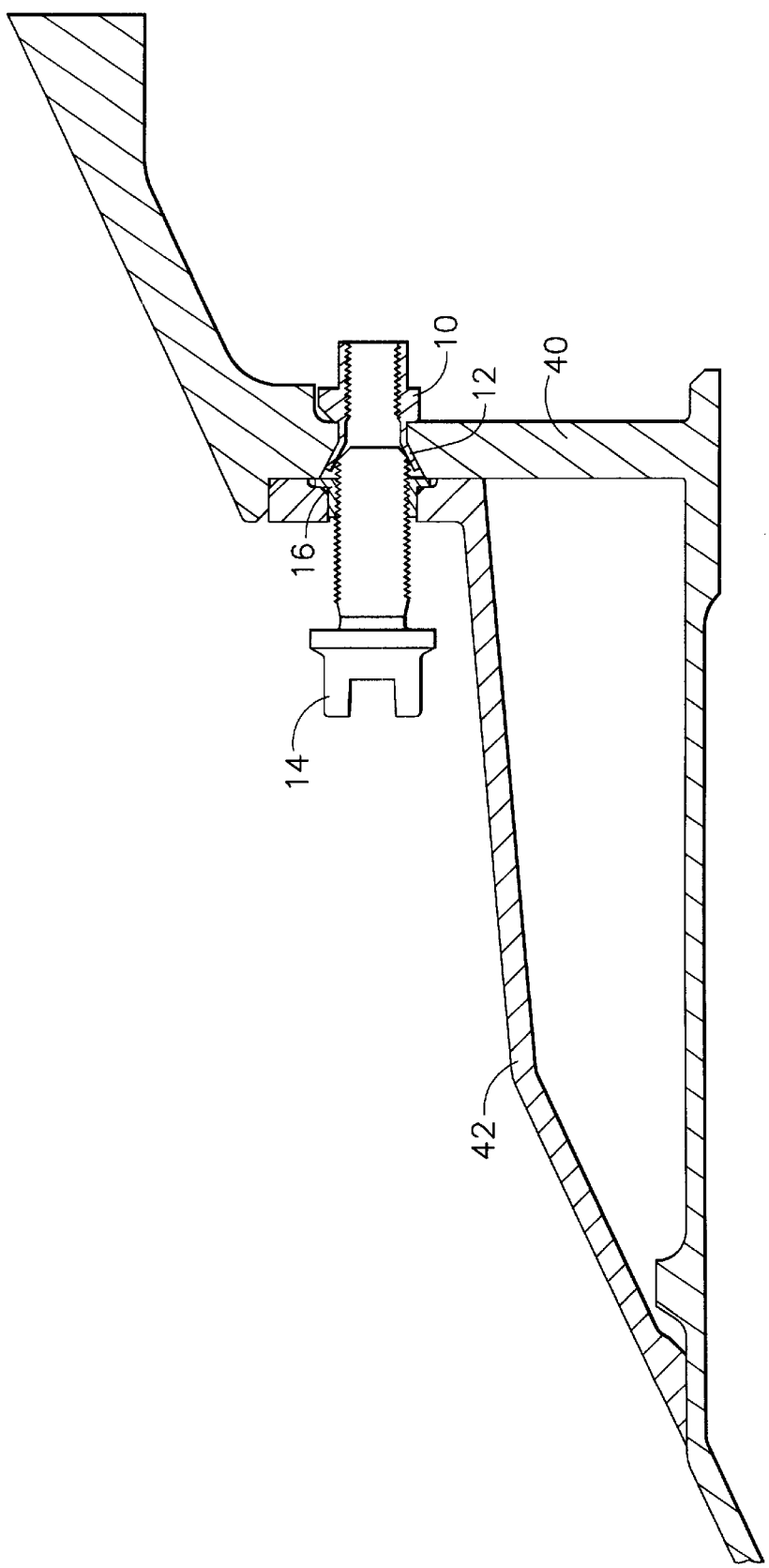
FIG. 1 illustrates a cross-sectional view of a prior art example of a d-nut used as the attachment nut for a structural assembly.

Referring to FIG. 1, a prior art example of a fastening nut 10, or d-nut, for use with a fastening bolt (not shown), includes a flange 12 against which a jack bolt 14 may be engaged. The fastening nut 10 may be attached to an inner cone structure 40. A bushing 16 may be fastened to the outer cone structure 42 through which a jack bolt 14 may be threaded. When the jack bolt 14 may be rotated against the flange 12 to separate the cone elements, the force of the jack bolt 14 may unswage the fastening nut 10. This may be particularly true with use of aluminum as the cone structural material.

Figure 2:
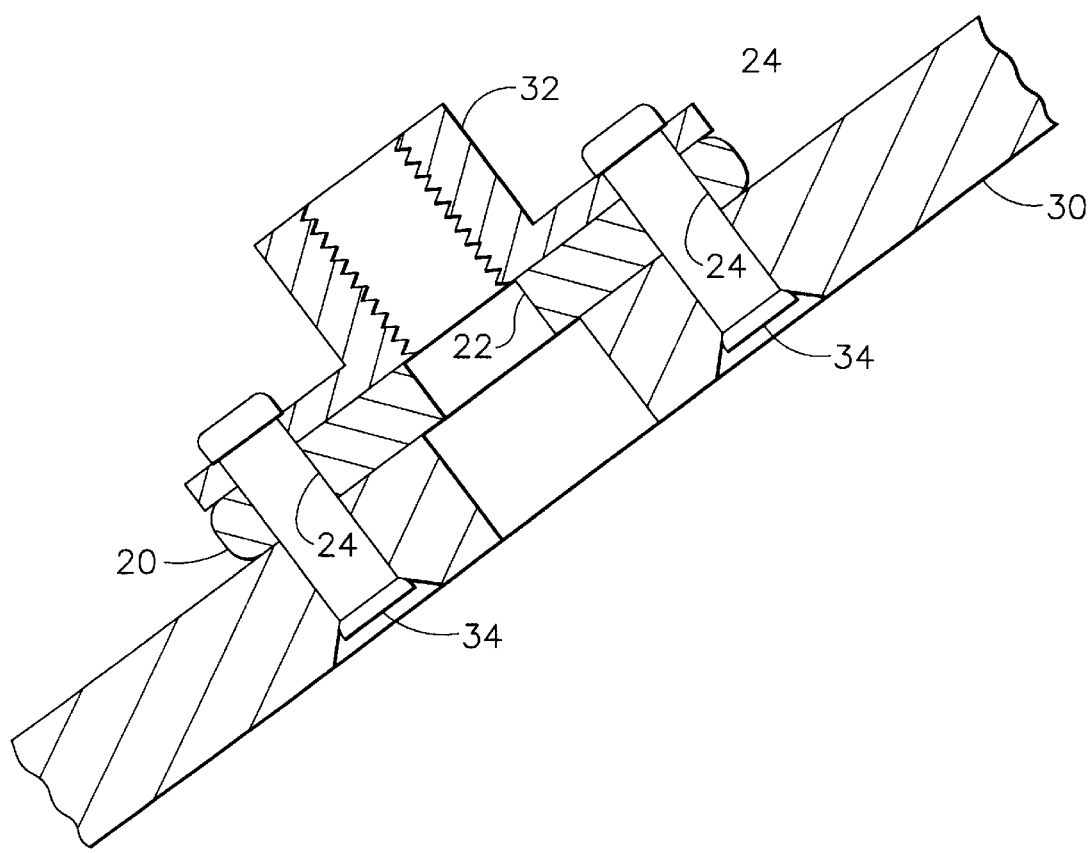
FIG. 2 illustrates a cross-sectional view of a jacking plate, according to an embodiment of the invention, fastened to a structural assembly.
Figure 3:
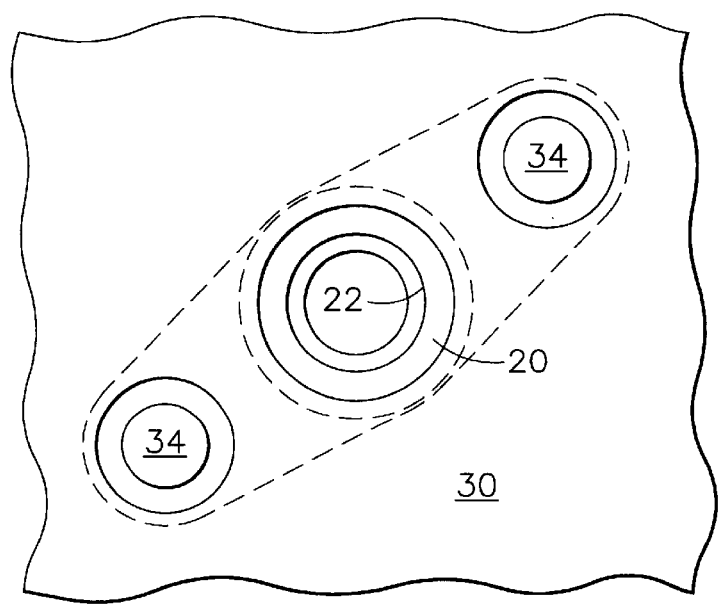
FIG. 3 illustrates a top plan view of a partial structural element with jacking plate attached according to an embodiment of the invention.

Referring to FIGS. 2 and 3, a jacking plate 20 may be fastened intermediate a structural element 30 and a nut plate 32 by, for example, rivets 34 inserted through fastening apertures 24. The use of a nut plate 32 alone with an aluminum structural element 30 may not provide sufficient structural support to inhibit deformation of the nut plate 32 when force by a jack bolt 14 may be applied. The attachment of a jacking plate 20 intermediate the structural element 30 and the nut plate 32 may minimize any deformation of the various elements. The jacking plate 20 may have a bolt aperture 22 through which a bolt may be inserted.

Figure 4:
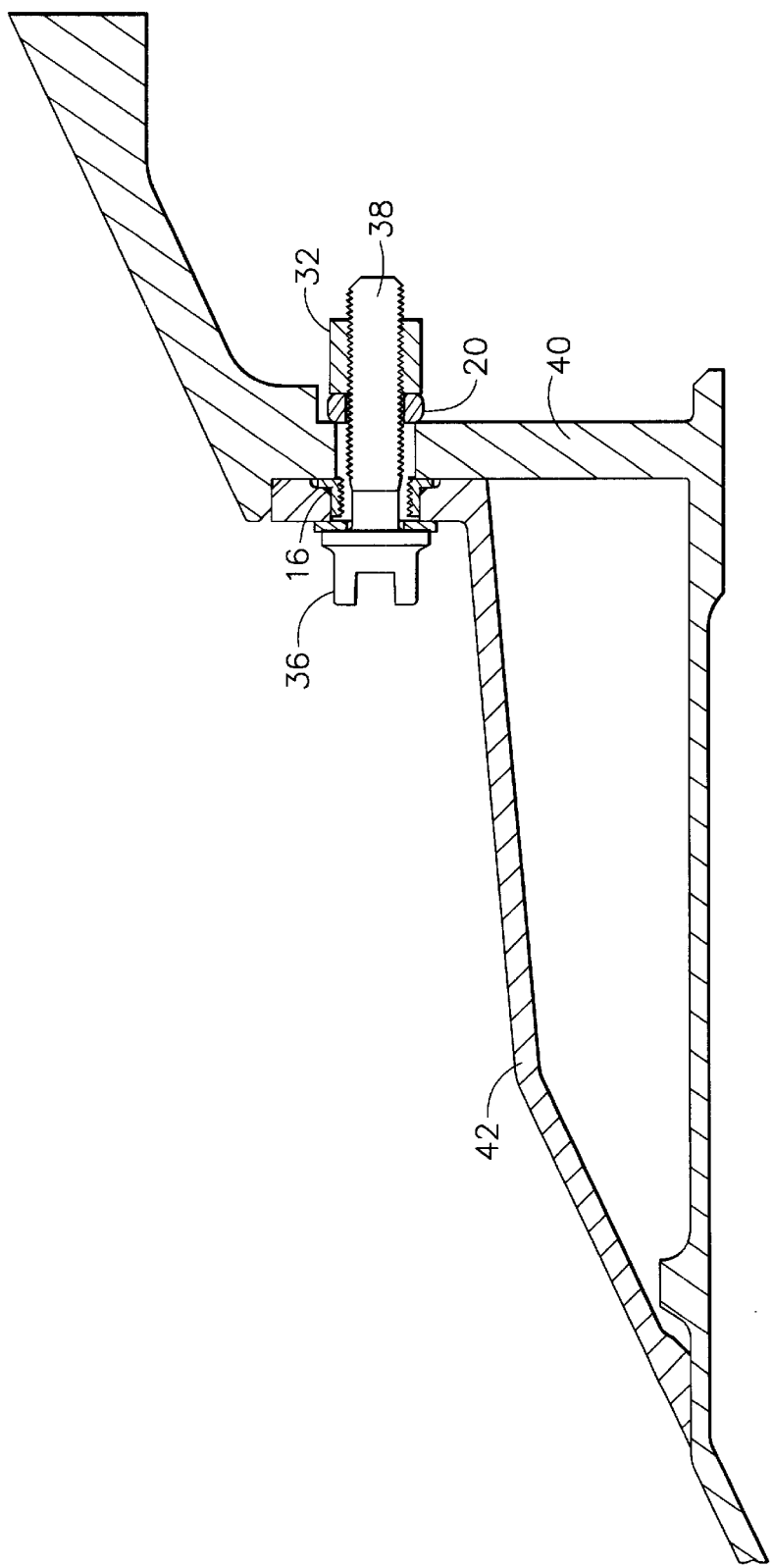
FIG. 4 illustrates a cross-sectional view of a jacking plate with a nut plate as the nut fastener for a bolt according to an embodiment of the invention.

Referring to FIG. 4, the inner cone structure 40 and outer cone structure 42 may be fastened together by a nut plate 32 and fastening bolt 36. There may be a jacking plate 20 fastened intermediate the nut plate 32 and the inner cone structure 40 wherein the bolt shaft 38 may be inserted through the structural element 30 and the aperture 22 to be threaded into the nut plate 32. There may also be a bushing 16 fastened into the outer cone structure 42 through which a jack bolt may be threaded. The jacking plate 20 may be an oblong plate structure for compatibility with known nut plate 32 devices. The jacking plate 20 material structure may be of hardened material, as compared to the aluminum structural element for example, such as stainless steel.

Figure 5:
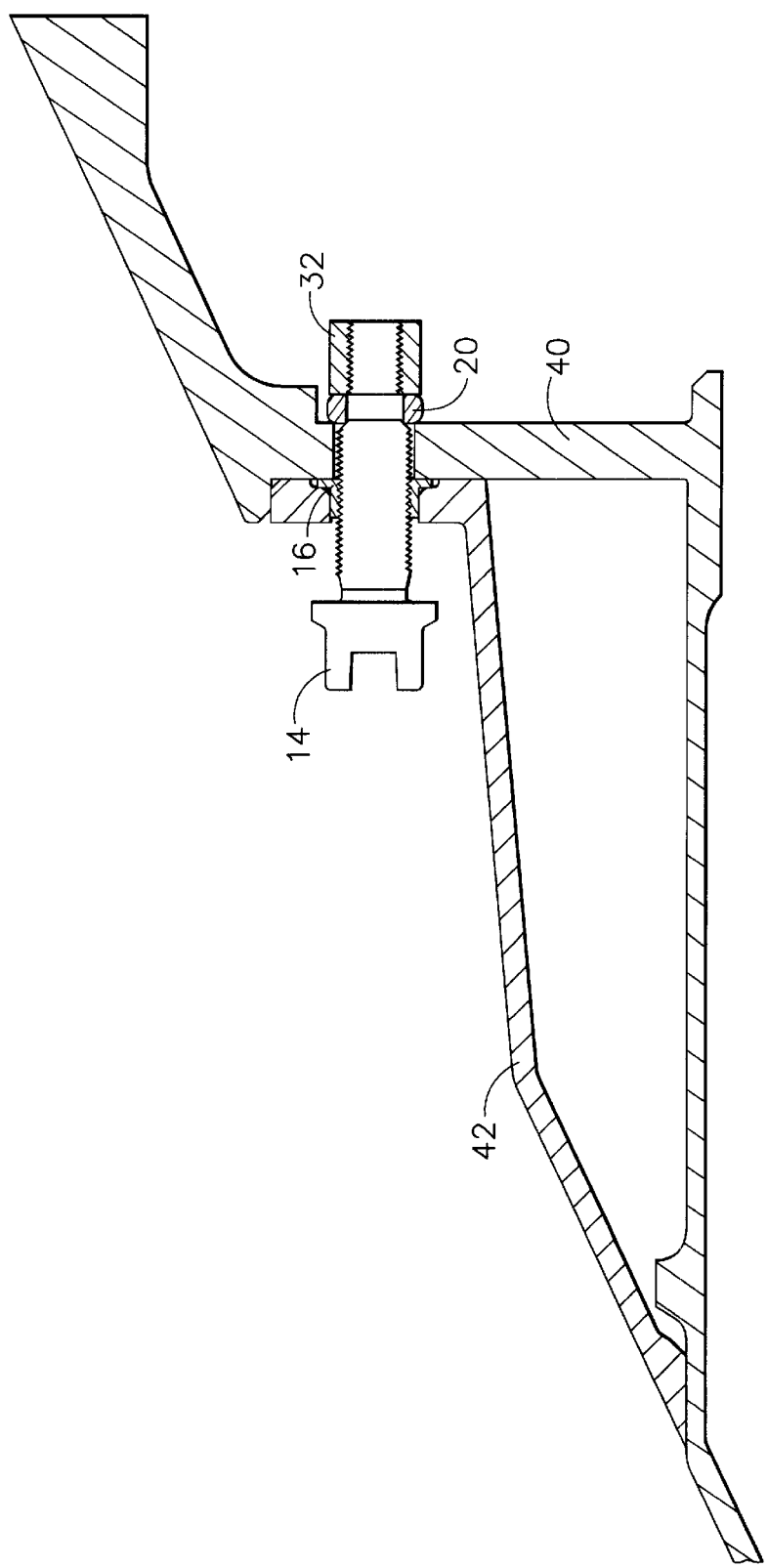
FIG. 5 illustrates a cross-sectional view of the application of a jack bolt to separate two structural assemblies according to an embodiment of the invention.

Referring to FIG. 5, a jack bolt 14 may be threaded through a bushing 16 attached to the outer cone structure 42. The jack bolt 14 may be rotated to apply force against the jacking plate 20 to cause separation of outer cone structure 42 from inner cone structure 40. The bolt aperture 22 of the jacking plate 20 may be sized to provide clearance for insertion of a fastening bolt, but may be small enough to inhibit the jack bolt 14 from passing through the bolt aperture 22. A jack bolt 14 size may be at least one size larger than a fastening bolt size.

It should be understood, of course, that the foregoing relates to preferred embodiments of the invention and that modifications may be made without departing from the spirit and scope of the invention as set forth in the following claims.

We claim:

1. A device to reinforce a structural assembly whose elements may be separated using a jack bolt, comprising:

a jacking plate having a bolt aperture formed therein and a plurality of jacking plate fastening apertures formed therein;

a nut plate having a plurality of fastening apertures formed therein;

a structural element having a plurality of structural element fastening apertures formed therein; and a plurality of fasteners, each of said plurality of fasteners passing through said nut plate fastening apertures, said jacking plate fastening apertures, and said structural element fastening apertures, wherein said plurality of fasteners fasten said nut plate on a first side of said jacking plate and fasten said structural element on a second side of said jacking plate.

2. The device as in claim 1 wherein said bolt aperture is sized for a fastening bolt to pass therethrough and for a jack bolt to be inhibited from passing therethrough.

3. The device as in claim 1 wherein said jacking plate is a hardened metal to inhibit deformation of said structural element and said nut plate when said jack bolt applies a separation force against said jacking plate.

4. The device as in claim 3 wherein said hardened metal is stainless steel.

5. The device as in claim 1 wherein the plurality of fasteners are rivets.

6. A device to reinforce a structural assembly whose elements may be separated using a jack bolt, comprising:

a jacking plate having a bolt aperture formed therein that is sized for a fastening bolt to pass therethrough and for a jack bolt to be inhibited from passing therethrough;

said jacking plate having a plurality of jacking plate fastening apertures formed therein;

a nut plate having a plurality of nut plate fastening apertures formed therein;

a structural element having a plurality of structural element fastening apertures formed therein; and a plurality of fasteners, each of said plurality of fasteners passing through said nut plate fastening apertures, said jacking plate fastening apertures, and said structural element fastening apertures, wherein said plurality of fasteners fasten said nut plate on a first side of said jacking plate and fasten said structural element on a second side of said jacking plate.

7. The device as in claim 6 wherein said jacking plate is a hardened metal to inhibit deformation of said structural element and said nut plate when a jacking bolt applies a separation force against said jacking plate.

8. The device as in claim 7 wherein said hardened metal is stainless steel.

9. The device as in claim 6 wherein the plurality of fasteners are rivets.

10. A jack bolt apparatus for separating first and second structural assembly elements, comprising:

a jacking plate having a bolt aperture formed therein that is sized for a fastening bolt to pass therethrough and for a jack bolt to be inhibited from passing therethrough, said jacking plate having a plurality of jacking plate fastening apertures formed therein;

a nut plate having a plurality of nut plate fastening apertures formed therein;

said first structural assembly element having a plurality of structural plate fastening apertures formed therein;

a plurality of fasteners, each of said plurality of fasteners passing through said nut plate fastening apertures, said jacking plate fastening apertures, and said first structural element fastening apertures, wherein said plurality of fasteners fasten said nut plate on a first side of said jacking plate and fasten said first structural element on a second side of said jacking plate; and a bushing attached to said second structural assembly element for threadable engagement with said jack bolt.

11. The jack bolt apparatus as in claim 10 wherein the plurality of fasteners are rivets.

\* \* \* \* \*